T. G. ROWE.
WHEEL DRIVE FOR AUTOMOBILES.
APPLICATION FILED AUG. 1, 1907.
940,069.
Patented Nov. 16, 1909.
2 SHEETS—SHEET 1.
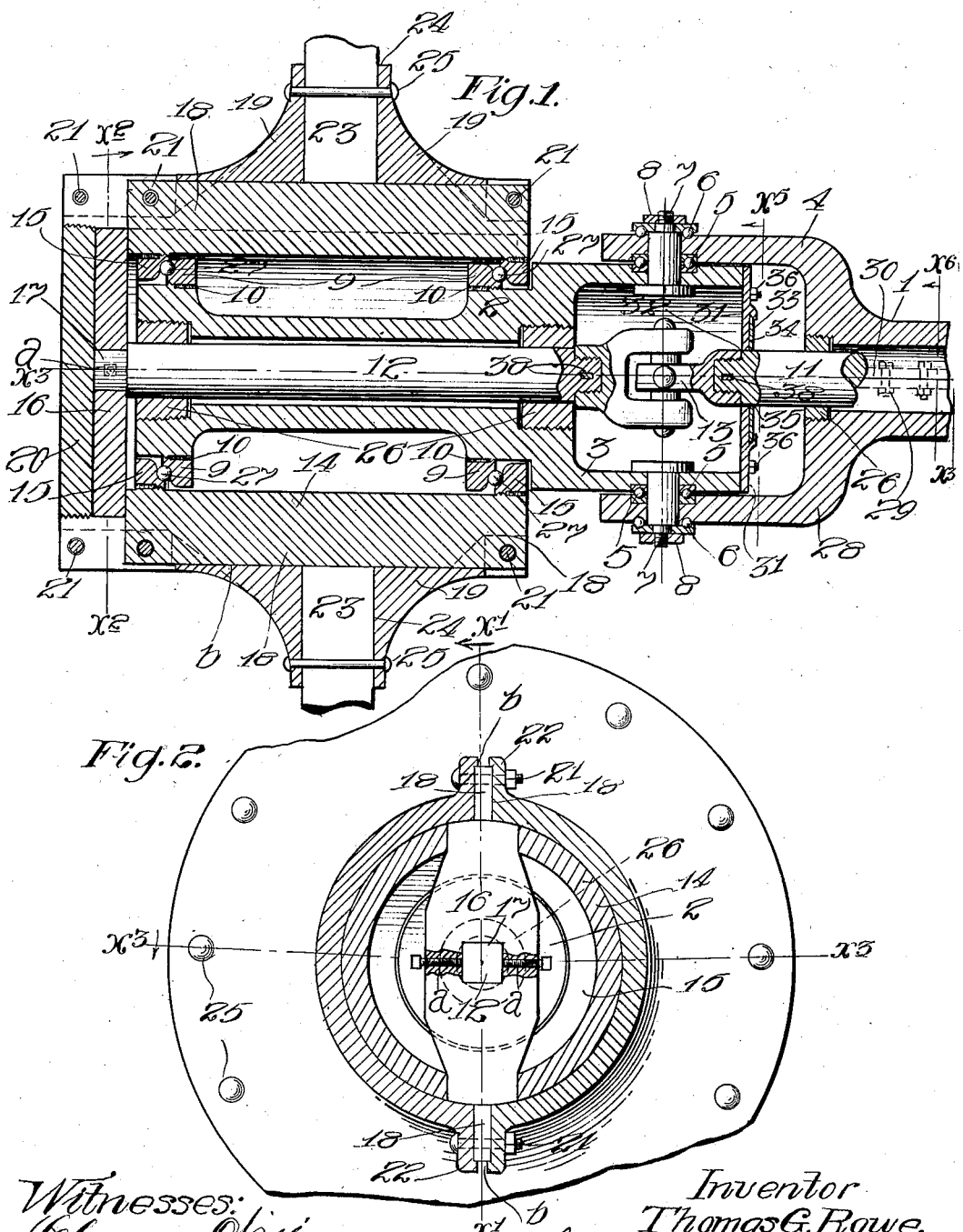
Witnesses:
Clarence Williams
Beulah Townsend
Inventor
Thomas G. Rowe.
James R. Townsend
his atty

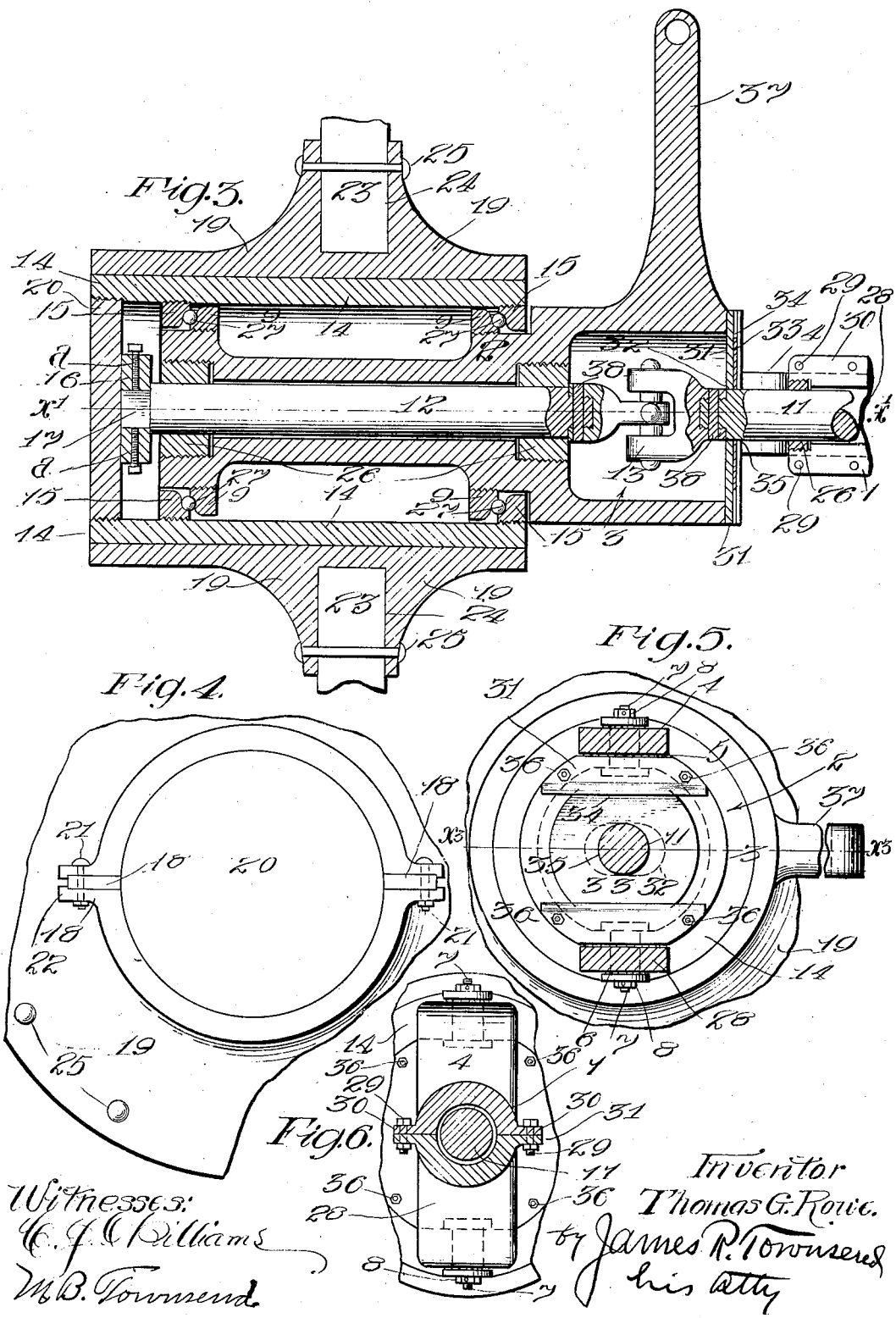

UNITED STATES PATENT OFFICE.

THOMAS G. ROWE, OF LOS ANGELES, CALIFORNIA.

WHEEL-DRIVE FOR AUTOMOBILES.

940,069. Specification of Letters Patent. Patented Nov. 16, 1909.

Application filed August 1, 1907. Serial No. 386,671.

To all whom it may concern:

Be it known that I, THOMAS G. ROWE, a citizen of the United States, residing at Los Angeles, in the county of Los Angeles and State of California, have invented new and useful Improvements in Wheel-Drives for Automobiles, of which the following is a specification.

An object of this invention is to provide a novel hub and a mechanism for clutching the hub to cause it to rotate with the driving shaft.

Another object of the invention is to provide a hub or wheel drive particularly for the front wheels, though the same may be used for the rear wheels as well.

A further object is to make provision whereby the driver may, in case of a puncture or other damage to a tire, repair the damage while on the road, with the greatest ease and convenience, and with minimum loss of time. This is accomplished by detachably mounting the spoke-shell of the wheel on the boxing so that one or more extra wheels with tires thereon may be carried by the car for use in an emergency; and when a tire becomes disabled the driver may at once remove the wheel from the boxing and replace it with a new wheel.

A further object is to provide an anti-friction wheel that is adapted for use in motor cars, that can be readily detached from its boxing, and replaced with a new one in case of a punctured tire or other disability, so as to avoid the delay and labor of replacing the tire, which is necessary with the usual construction of wheels.

The accompanying drawings illustrate the invention.

Figure 1 is a fragmentary axial section of a wheel-drive embodying the invention. The knuckle-pins and portions of the driver are shown intact. $x^1$, Figs. 2 and 3, indicates the plane of section. Fig. 2 is a sectional elevation $x^2$—$x^2$, Fig. 1, looking to the right. Fig. 3 is a plan section on a plane at right angles to that of Fig. 1, as indicated by line $x^3$, Figs. 1, 2 and 5. Fig. 4 is a fragmental end elevation from the left of Fig. 3. Fig. 5 is a sectional elevation from line $x^5$, Fig. 1, looking to the left. Fig. 6 is a section on line $x^6$, Fig. 1, looking to the left.

Arrows on the several section lines indicate the direction of sight.

1 and 2 designate the inner and the outer sections respectively of the axle.

3 is the knuckle socket on the inner end of the outer axle section, and 4 the fork of the inner axle section.

5 designates ball bearings between the knuckle-socket 3 and the fork 4 and its counterpart 28.

6 designates ball bearings on the outside of the forks around the knuckle-pins 7 which are secured in place by nuts 8 outside the bearings 6.

9 designates ball cones on the outer axle held in place by lock screws 10.

11 designates the inner section of the driver, which it is to be understood is driven by any suitable means as by the usual differential gear, not shown. 12 is the outer section of the driver. Said sections 11 and 12 are connected together by a universal joint 13, the pivots of which are in the plane of the knuckle-pins or pivots 7, as indicated by the vertical line drawn therethrough in Fig. 1.

14 designates a boxing for the outer section of the axle.

15 designates cones inside the boxing.

16 is a driving gear notched in the boxing 14.

$a$ designates screws fastening the driving bar 16 on the angular end 17 of the outer section of the driver.

18 designates feathers on the boxing.

19 is a slotted spoke-shell, in the slots $b$ of which the feathers 18 fit.

20 is a dust-cap screwed into the hub of the spoke-shell outside the driving bar 16.

21 designates bolts passed through the walls 22 of the slot $b$ to deflect or spring in said walls to clamp the feathers 18.

23 designates spokes in the spoke-seat 24 of the spoke-shell.

25 are the usual spoke rivets between the spokes to secure the spokes in the shell.

26 designates boxing between the driver and the axle.

27 designates the balls of the axle bearings.

28 designates the detachable under fork of the axle, the same being a counterpart of the main fork 4 and secured in place by bolts and flanges 29 and 30.

31 designates a dust-cap for the inner end of the outer axle section, the same being provided with a slot 32 to admit the inner driver-section 11, and to allow the outer axle-section to swing freely.

33 designates a dove-tail slide in a dove-tail way 34, the same being provided with a circular hole 35 to fit the inner driver section 11 and being adapted to cover the slot 32 and to slide along the way 33 as the cap 31 is moved by the swinging of the outer axle section.

36 designates stud bolts and nuts securing the inner dust-cap 31 to the inner end of the knuckle-socket 3.

37 is the usual arm for the steering-rod.

When the parts are assembled, as shown in Figs. 1, 2 and 3, the wheel may be regarded as comprising the spoke-shell 19, outer dust-cap 20, and the usual spokes and rim. The side thrust or strain transmitted through the spokes 23 will be borne by the spoke-shell, the feathers clamped therein, the clamping bolts 21, the cones 15 and 9, the outer section of the axle, the knuckle pivots 7, and the forks of the inner axle. The torque of the driver 11 and 12 operates through the driving bar 16, the boxing 14 into which the bar is notched, the feathers 18, the spoke-shell 19, and the spokes 23.

The spoke-shell and the spokes may readily be detached from the boxing by simply removing the bolts 21. By this construction it is made feasible to provide for the motor car an extra spoke shell with the usual spokes, rim, and tire thereon, to be carried for use in cases of emergency instead of the extra tire now usually carried by motor cars, so that in case a tire of a car equipped with this improvement should become punctured or otherwise disabled the injury can be at once repaired by removing bolts 21 and detaching the spoke-shell which carries the disabled tire and replacing the same with the extra-shell and its attachments, thus avoiding the delay and inconvenience of dismounting the injured tire and replacing it with another tire while on the road.

The manner of assembling the parts will be apparent from inspection of the drawings. The universal joint 13 is preferably screwed onto the inner and outer sections 11 and 12 of the driver and fastened by pins 38. Said universal joint may be inserted in the space at one side between the knuckle-socket 3 and the dust-cap 31 when the nuts have been loosened from the stud-screws 36 for that purpose. This can be done after the pivot-pin 7 has been inserted. The detachable section 28 need not be applied until all the other parts are in position.

What I claim is:—

1. The combination of the two-part, pivotal jointed axle incasing a universal jointed two-part driver having a clutch member to engage a notched boxing surrounding part of said driver, with a spoke-shell surrounding said boxing, means for tightening said shell to cause it to rotate with said driver and boxing, and a dust-cap fitting the end of the spoke-shell and clamped thereon by the tightening of the shell.

2. A wheel for a motor-car having a longitudinally slotted spoke-shell, a boxing provided with feathers to fit said slots, and bolts to spring the walls of the slots to clamp the boxing.

3. A wheel for motor-cars comprising a slotted spoke-shell, a boxing provided with feathers to fit the slots, and bolts through the walls of the slots and through the feathers to spring the walls of the slots and to hold the feathers.

In testimony whereof, I have hereunto set my hand at Los Angeles California this 25th day of July 1907.

THOMAS G. ROWE.

In presence of—
JAMES R. TOWNSEND,
M. BEULAH TOWNSEND.